(12) United States Patent
Vavra et al.

(10) Patent No.: US 9,431,036 B2
(45) Date of Patent: Aug. 30, 2016

(54) HEAT-SINKS FOR OPTICAL NEAR-FIELD TRANSDUCERS

(75) Inventors: William Paul Vavra, Maple Plain, MN (US); Xuhui Jin, Shakopee, MN (US); Xiaoyue Huang, Eden Prairie, MN (US); Michael Christopher Kautzky, Eagan, MN (US); Kaizhong Gao, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 928 days.

(21) Appl. No.: 12/976,559

(22) Filed: Dec. 22, 2010
(Under 37 CFR 1.47)

(65) Prior Publication Data

US 2012/0163139 A1    Jun. 28, 2012

(51) Int. Cl.
*G11B 7/085*    (2006.01)
*G11B 5/31*    (2006.01)
*G11B 5/00*    (2006.01)

(52) U.S. Cl.
CPC ....... *G11B 5/314* (2013.01); *G11B 2005/0021* (2013.01)

(58) Field of Classification Search
None
See application file for complete search history.

(56) References Cited

U.S. PATENT DOCUMENTS

| 5,600,619 | A | 2/1997 | Takekoshi et al. | |
|---|---|---|---|---|
| 5,680,385 | A | 10/1997 | Nagano | |
| 7,391,590 | B2 * | 6/2008 | Matono et al. | 360/125.32 |
| 7,609,480 | B2 | 10/2009 | Shukh et al. | |
| 2005/0024957 | A1 * | 2/2005 | Gider et al. | 365/200 |
| 2006/0233061 | A1 | 10/2006 | Rausch et al. | |
| 2006/0233062 | A1 | 10/2006 | Bedillion et al. | |
| 2007/0036040 | A1 | 2/2007 | Mihalcea et al. | |
| 2010/0214685 | A1 * | 8/2010 | Seigler et al. | 360/59 |
| 2011/0228418 | A1 * | 9/2011 | Sasaki et al. | 360/59 |
| 2012/0039155 | A1 * | 2/2012 | Peng et al. | 369/13.14 |
| 2012/0051196 | A1 * | 3/2012 | Grobis et al. | 369/13.24 |

FOREIGN PATENT DOCUMENTS

| CN | 1402222 A | 3/2002 |
|---|---|---|
| JP | 2009-059417 | 3/2009 |
| JP | 2012-053973 | 3/2012 |
| WO | 2010-098794 A1 | 9/2010 |

\* cited by examiner

*Primary Examiner* — Joseph Feild
*Assistant Examiner* — Henok Heyi
(74) *Attorney, Agent, or Firm* — HolzerIPLaw, PC (57) ABSTRACT

Thermal energy is generated within an optical NFT when in operation within a HAMR head. A heat-sink assembly within the HAMR head extracts thermal energy from the optical NFT and transmits the thermal energy via convection to air surrounding the HAMR head, radiation to surfaces adjacent to the HAMR head, and/or conduction to other parts of the HAMR head. The thermal energy generated within the optical NFT is conducted to the heat-sink. An air-bearing surface of the heat-sink convectively transfers at least some of the thermal energy to air passing between the air-bearing surface and a surface of an adjacent magnetic medium. Further, some of the thermal energy may also radiatively transfer from the air-bearing surface to the magnetic medium.

19 Claims, 8 Drawing Sheets

HEAT-SINKS FOR OPTICAL NEAR-FIELD TRANSDUCERS

SUMMARY

Implementations described and claimed herein provide for a heat assisted magnetic recording head with an optical near-field transducer and a heat-sink assembly. The heat-sink assembly is in thermally conductive contact with the optical near-field transducer and has a convectively cooled surface.

Other implementations are also described and recited herein.

DETAILED DESCRIPTIONS

Heat assisted magnetic recording (HAMR) technology magnetically records data on high-stability media using focused light to first heat the media. HAMR technology takes advantage of high-stability magnetic compounds such as iron platinum alloy to constitute the media. These materials can store single bits in a much smaller area without being limited by the same superparamagnetic effect that limits conventional technology used in magnetic media storage. However, the high-stability magnetic compounds must first be heated to apply changes in magnetic orientation on the media.

In one implementation, a HAMR head contains at least an optical near-field transducer (NFT) and a write pole. The optical NFT is used to collect and focus light at the media. The focused light increases the temperature of a spot on the media high enough to allow changes in magnetic orientation caused by the write pole (e.g., a temperature increase of several hundred degrees). However, the extreme heat generated when the optical NFT collects and focuses light severely limits the operating life of the optical NFT.

Finite element analysis indicates that the temperature of the optical NFT can exceed 500 degrees Celsius when focusing sufficient light to allow changes in magnetic orientation of the media. The presently disclosed technology discloses heat-sinks for thermal management of the optical NFT. However, several challenges exist. First, there is minimal surface area for thermal energy dissipation because of the small size of the optical NFT (e.g., generally 100 nm to 200 nm wide). Second, nothing placed in the vicinity of the optical NFT can significantly impair or alter the efficiency or resonant frequency of the write pole and/or optical NFT. In other implementations, additional microelectronic components are included in the HAMR head (e.g., one or more readers and sensors). Nothing placed in the vicinity of the optical NFT can significantly alter the efficiency or resonant frequency of any of the additional microelectronic components, as well.

As a result, the presently disclosed heat-sinks and heat-sink assemblies extract thermal energy from the optical NFT and transmit the thermal energy via convection to air surrounding the HAMR head, radiation to surfaces adjacent to the HAMR head (e.g., a magnetic media), and/or conduction to other parts of the HAMR head. In other implementations, the optical NFT and heat-sink(s) are utilized in a recording head other than a HAMR head.

Figure 1:
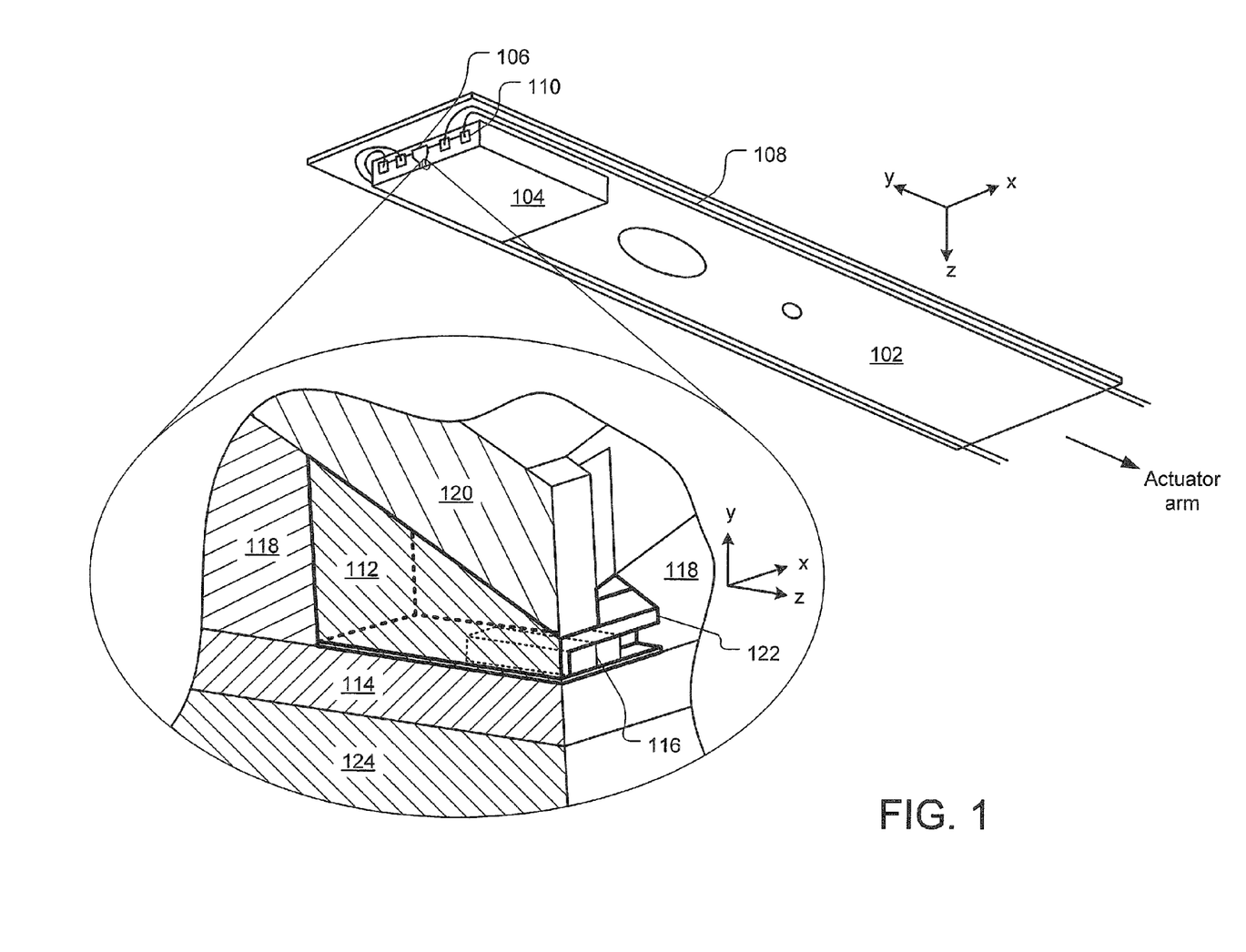
FIG. 1 illustrates an example actuator arm flexure with a heat assisted magnetic recording head utilizing an encapsulating heat-sink mounted at its distal end.

FIG. 1 illustrates an example actuator arm flexure 102 with a HAMR head 106 utilizing an encapsulating heat-sink 112 mounted at its distal end. A coordinate axis is shown with a y-direction extending lengthwise down the flexure 102 toward the distal end of the flexure 102, a x-direction extending endwise across the flexure 102 in a direction parallel to a corresponding magnetic media (now shown), and a z-direction extending downward toward the magnetic media. The actuator arm flexure 102 is attached to a cantilevered actuator arm (not shown) extending in the y-direction and the actuator arm flexure 102 is adjustable in the z-direction to follow one or more tracks of magnetic bits on the magnetic media. An air-bearing slider (ABS) 104 with the HAMR head 106 is mounted at a distal end of the flexure 102 on a surface of the flexure 102 facing the magnetic media (not shown). The slider 104 enables the HAMR head 106 to fly in close proximity above a corresponding surface of the magnetic media. Electrical wires (e.g., wire 108) extend along the flexure 102 generally in the y-direction and attach to contact pads (e.g., pad 110) on the slider 104 that ultimately connect to the HAMR head 106. Read/write and other electrical signals pass to and from processing electronics (not shown) to the HAMR head 106 via the electrical wires and contact pads.

The HAMR head 106 is also shown sectioned, enlarged, and rotated in FIG. 1. The HAMR head 106 is enlarged and rotated 90 degrees about the x-axis and 90 degrees about the z-axis and the HAMR head 106 is sectioned about a y-z plane running through the middle of the HAMR head 106 so that the orientations of various components within the HAMR head 106 become apparent. A substrate 124 serves as a mounting surface for the HAMR head 106 components and connects the HAMR head 106 to the ABS 104. A waveguide core 114 mounted on the substrate 124 transmits light waves to an optical NFT 116 which focuses and directs the light to a point on a magnetic media (not shown).

Typically, optical NFTs (e.g., optical NFT 116) are surrounded by $Al_2O_3$, which serves as an optical waveguide cladding material in HAMR heads. While the optical properties of $Al_2O_3$ are suitable for waveguides, the thermal conductivity of $Al_2O_3$ is very low (e.g., 1.35 W/m/K). This effectively traps the energy absorbed by the optical NFT as thermal energy, severely limiting the operating life of the optical NFT.

One way to overcome this shortcoming of $Al_2O_3$ is to surround or encapsulate the optical NFT with a block of optical quality dielectric used as a heat-sink. This heat-sink must have a higher thermal conductivity than $Al_2O_3$ and be large enough to allow effective heat transfer from the optical NFT. Further, the heat-sink should be small enough and/or oriented within the HAMR head so that does not significantly affect optical NFT resonance and/or cause waveguide loss. In one implementation, a component of the optical NFT is 200 nm in diameter. The heat-sink should have adequate size to make good contact with the optical NFT. Still further, the heat-sink should be small enough and/or oriented within the HAMR head so that it does not significantly affect any other microelectronic components within the HAMR head (e.g., one or more readers and sensors). In one implementation, the heat-sink may be made of various metallic compounds producible in a crystalline phase (e.g., MgO, $MgF_2$, LiF, $CaF_2$, $BaF_2$, BeO, ZnO, $Si_3N_4$, and/or AlN).

In FIG. 1, the optical NFT 116 is shown surrounded by heat-sink 112 (illustrated in bold). The heat-sink 112 is deposited on the waveguide core 114 with the optical NFT 116 deposited within the heat-sink 112. Away from the optical NFT 116, conventional optical waveguide cladding material 118 (e.g., $Al_2O_3$) is used. A write pole 120 is deposited over the heat-sink 112 and/or cladding material 118.

In one implementation, the heat-sink 112 conductively extracts thermal energy from the optical NFT 116 and conductively transmits the thermal energy to surrounding HAMR head 106 components (e.g., waveguide core 114, cladding material 118, and/or write pole 120). In another implementation, the heat-sink 112 radiatively transmits the thermal energy to an adjacent magnetic media (not shown) located generally in the z-direction from an air-bearing surface 122 of the heat-sink 112 facing the magnetic media. In still another implementation, the heat-sink 112 convectively transmits the thermal energy to moving air adjacent the air-bearing surface. In yet another implementation, the heat-sink 112 utilizes a combination of conductive, radiative, and convective thermal energy transfer to manage the temperature of the optical NFT 116.

In an example implementation of an optical NFT within a HAMR head without a heat-sink, the temperature of the optical NFT rises over 500° C. during operation of the HAMR head. When a heat-sink is added, an inverse relationship between the thermal conductivity of the heat-sink and temperature rise of the optical NFT during operation becomes apparent. In an example implementation, a heat-sink as depicted in FIG. 1 extends 0.5 microns in the negative z-direction from the air bearing surface 122, and 0.5 µm in the cross-track direction (i.e., x-direction). When the heat-sink has a thermal conductivity of 5 W/m/K, the temperature of the optical NFT rises about 275° C. during operation of the HAMR head. When the heat-sink has a thermal conductivity of 20 W/m/K, the temperature of the optical NFT rises about 150° C. during operation of the HAMR head.

Figure 2A:
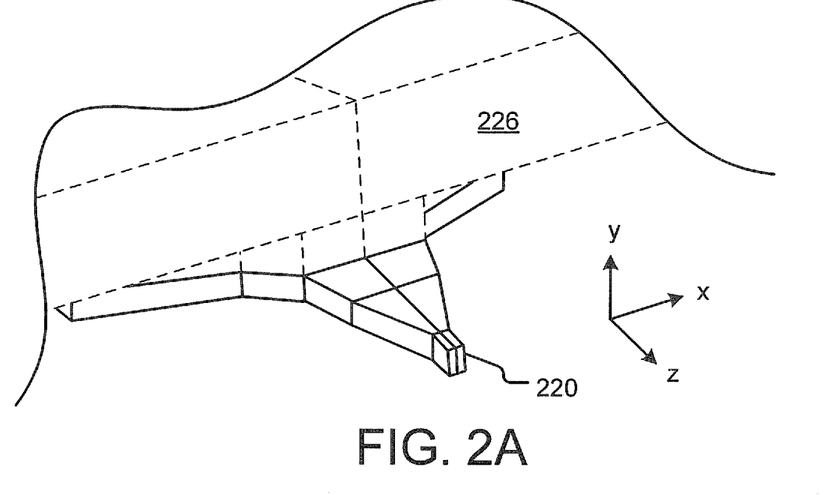
FIG. 2A illustrates a perspective view of an example write pole and yoke.

FIG. 2A illustrates a perspective view of an example write pole 220 and yoke 226. The write pole 220 (illustrated in solid lines) is attached to the yoke 226 (illustrated in dashed lines) and extends away from the yoke 226 in the z-direction and negative y-direction. The yoke 226 is attached to magnetic coils (not shown) which receive a write signal from off-head processing electronics (not shown). The yoke 226 transmits the write signal from the magnetic coils to the write pole 220, which applies the write signal to a media to change the magnetic polarization of bits on the media, thereby writing data from the write signal to the media.

In a HAMR head, an optical NFT (not shown) is located adjacent the depicted write pole 220 and yoke 226. In one implementation, conductively extracting thermal energy from the write pole 220 aids in extracting thermal energy from the optical NFT.

Figure 2B:
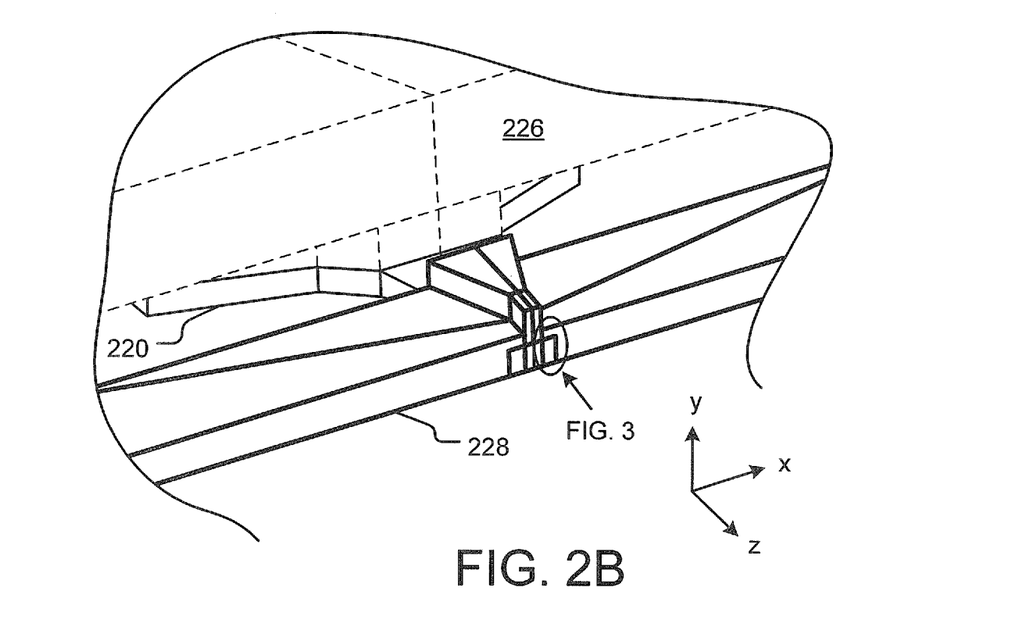
FIG. 2B illustrates the write pole and yoke of FIG. 2A with an example metal overlay heat-sink.

FIG. 2B illustrates the write pole 220 and yoke 226 of FIG. 2A with an example metal overlay heat-sink 228. The heat-sink 228 (illustrated in bold) overlays the write pole 220 and extends in the x-direction and negative x-direction away from the write pole 220. In one implementation, the heat-sink 228 extends several microns (e.g., 4 µm-20 µm) in the x-direction and negative x-direction (i.e., cross-track directions) and is just a few tenths of a micron thick in the y-direction and z-direction. In this implementation, the heat-sink 228 has sufficient size and surface area to reduce optical NFT temperatures by 25% to 30%. In an implementation, one or more metals having good thermal conductivity may be used to form the metal overlay (e.g., Cr, Ru, Cu, Au, Ag, Al, Ni, Ir, Pt, W, Ti, Mo, Zr, Rh, Pd, V, and alloys or dopings thereof).

Figure 3:
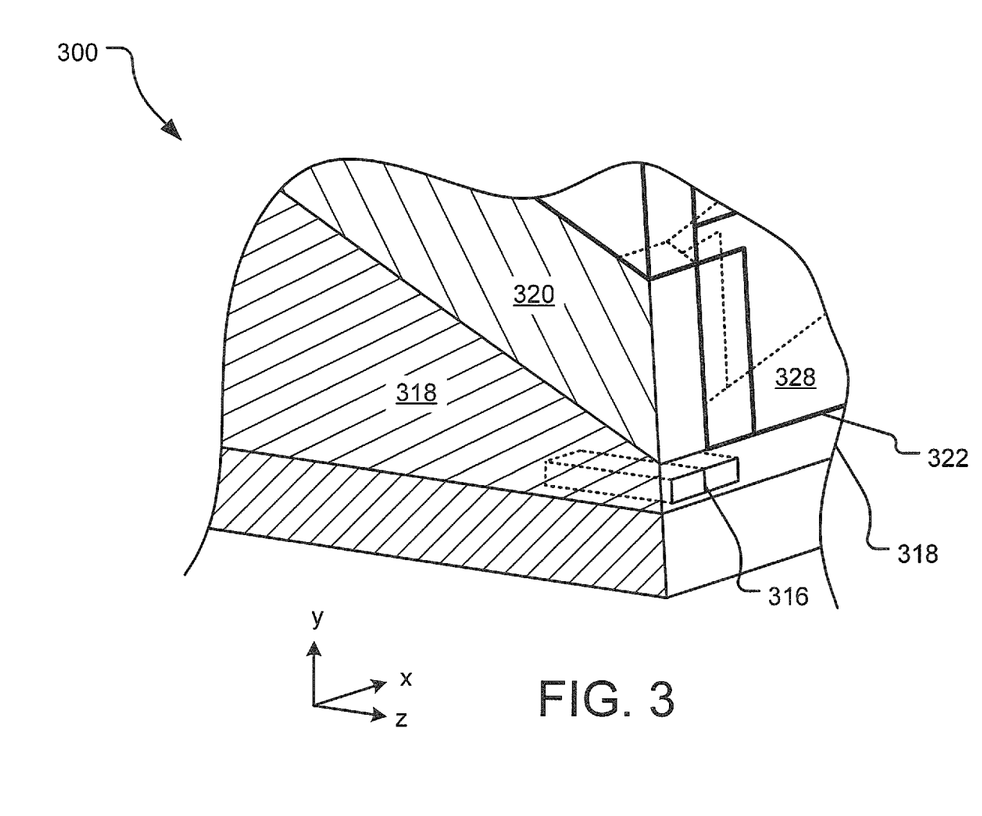
FIG. 3 illustrates a cross-section of a partial perspective view of an example heat assisted magnetic recording head having a write pole with a metal overlay heat-sink.

FIG. 3 illustrates a cross-section of a partial perspective view of an example HAMR head 300 having a write pole 320 with a metal overlay heat-sink 328. FIG. 3 is a detail view of the interface between the write pole 220 and the heat-sink 228 as shown in FIG. 2B. Heat-sink 328 extends in the x-direction and y-direction from write pole 320. Further, the heat-sink 328 does not actually contact optical NFT 316 in the implementation shown. Thermal energy transfer from the optical NFT 316 to the heat-sink 228 is via the write pole 320 and any surrounding cladding material 318.

The heat-sink 328 maximizes thermal energy dissipation from the optical NFT 316 by taking advantage of convective thermal energy transfer at air bearing surface 322. Heat-sink 328 is preferably made of a non-magnetic metal to minimize risks of side-track erasure and/or interference with the write pole 320. In one implementation, the heat-sink 328 is compatible with post-deposition slider processing (e.g., separating of dice from the wafer, lapping the dice, polishing the dice, patterning aerodynamic structures on the dice, applying protective coating(s) on the dice, etc.). Further, the heat-sink 328 does not protrude toward a media beyond the write pole 320 (both when a heater is on, pushing the write pole 320 toward the media and when the heater is off). As a result, the heat-sink 328 does not cause topography problems in the trailing edge of the HAMR head 300.

Figure 4B:
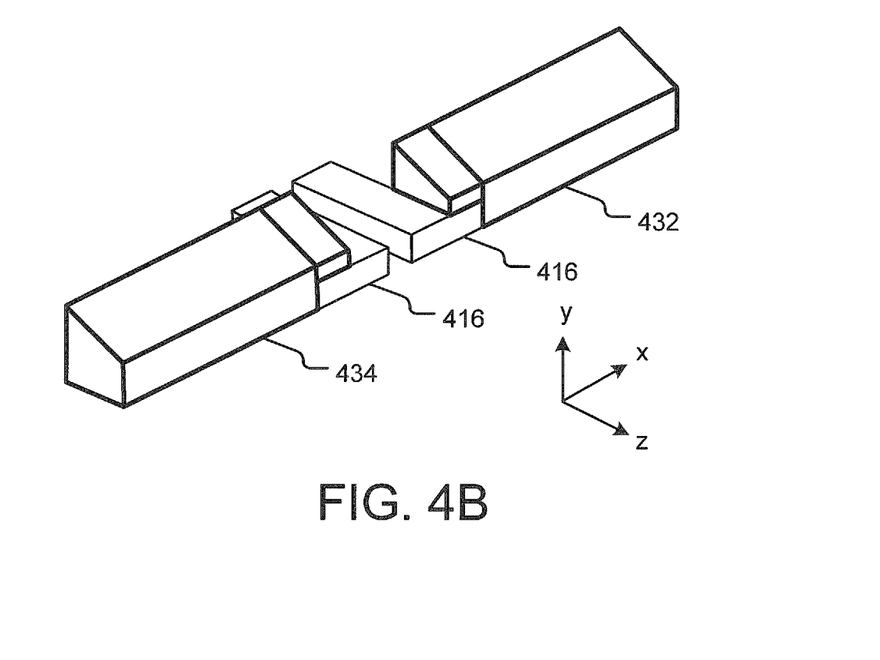
FIG. 4B illustrates the optical near-field transducer of FIG. 4A with example wing-like heat-sinks.
Figure 5:
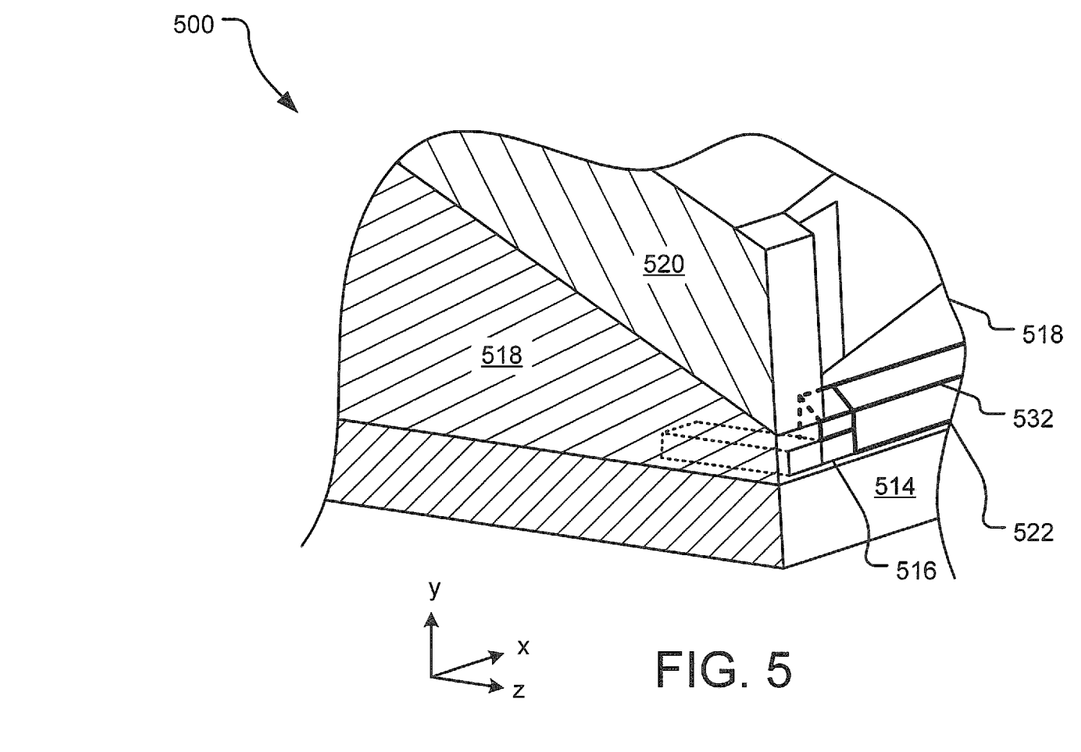
FIG. 5 illustrates a cross-section of a partial perspective view of an example heat assisted magnetic recording head having an optical near-field transducer with wing-like heat-sinks.

In one implementation, the heat-sink 328 may be combined with one or more of the other thermal energy dissipating devices disclosed herein. In particular, heat-sink 328 is particularly effective when used in conjunction with a wing-like heat-sink 432, 532 as shown in FIGS. 4B and 5. Combinations of one or more of the heat-sinks disclosed herein are referred to as heat-sink assemblies.

Figure 4A:
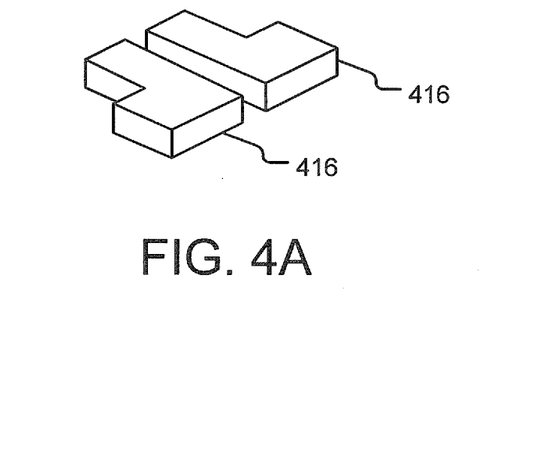
FIG. 4A illustrates a perspective view of an example optical near-field transducer.

FIG. 4A illustrates a perspective view of an example optical NFT 416. The optical NFT 416 is used to collect and focus light at a media (not shown). The focused light increases the temperature of a spot on the media high enough to allow changes in magnetic orientation caused by a write pole (not shown).

FIG. 4B illustrates the optical near-field transducer 416 of FIG. 4A with example wing-like heat-sinks 432 and 434. The heat-sinks 432, 434 (illustrated in bold) partially overlay the optical NFT 416 and extend in the x-direction and y-direction away from the optical NFT 416. In one implementation, the heat-sinks 432 and 434 extend several microns (e.g., 4 µm-20 µm) in the x-direction and negative x-direction (i.e., cross-track directions) and are thicker in the y-direction than the optical NFT 416.

As a result, the heat-sinks 432 and 434 may contact the heat-sink 228 and 328 of FIGS. 2B and 3, if used in conjunction with one another. This combination has little to no impact on the optical NFT's optical efficiency. Used together, the heat-sinks 228, 328 and 432, 434 have sufficient size and surface area to reduce optical NFT temperatures by up to 50%. In an implementation, one or more metals having good thermal conductivity may be used to form the heat-sinks 432 and 434 (e.g., Cr, Ru, Cu, Au, Ag, Al, Ni, Ir, Pt, W, Ti, Mo, Zr, Rh, Pd, V, and alloys or dopings thereof). In some implementations, the heat-sinks 432 and 434 may be composed of the same material as the optical NFT 416.

FIG. 5 illustrates a cross-section of a partial perspective view of an example HAMR head 500 having an optical NFT 516 with a wing-like heat-sink 532. FIG. 5 is a detail view of the interface between optical NFT 516, wing-like heat-sink 532, and a write pole 520. Heat-sink 532 extends in the x-direction and y-direction from the optical NFT 516. Thermal energy conductively transfers from the optical NFT 516 to the heat-sink 532. The thermal energy is then conducted away from the heat-sink 532 to any surrounding cladding material 518, a waveguide core 514, and/or to the write pole 520. Further, convective thermal energy transfer at air bearing surface 522 carries thermal energy away from the heat-sink 532.

To improve conductive transfer of thermal energy away from the wing-like heat-sink 532, the heat-sink 532 may be used in conjunction with the heat-sink 228, 328 of FIGS. 2A and 3. Due to the relatively large surface area of the heat-sink 228, 328 at air bearing surface 522; convective thermal energy transfer is significantly greater when compared to an implementation using heat-sink 532 alone. In other implementations, the heat-sink 532 may be combined with one or more of the other thermal energy dissipating device disclosed herein.

Figure 6A:
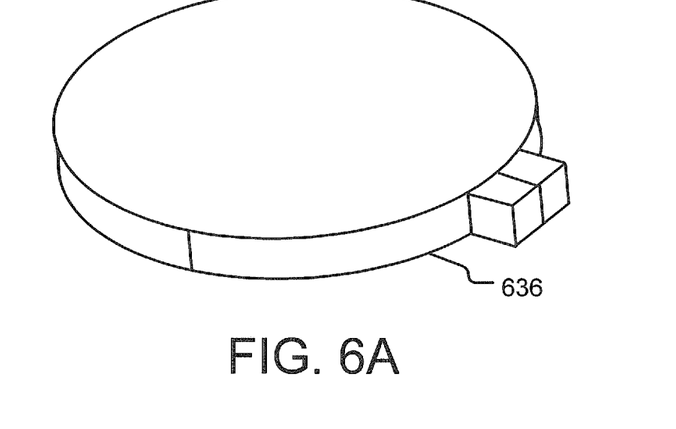
FIG. 6A illustrates a perspective view of an example circular optical near-field transducer.

FIG. 6A illustrates a perspective view of an example circular optical NFT 636. The circular optical NFT 636 is used to collect and focus light at a media (not shown). The focused light increases the temperature of a spot on the media high enough to allow changes in magnetic orientation caused by a write pole (not shown).

Figure 6B:
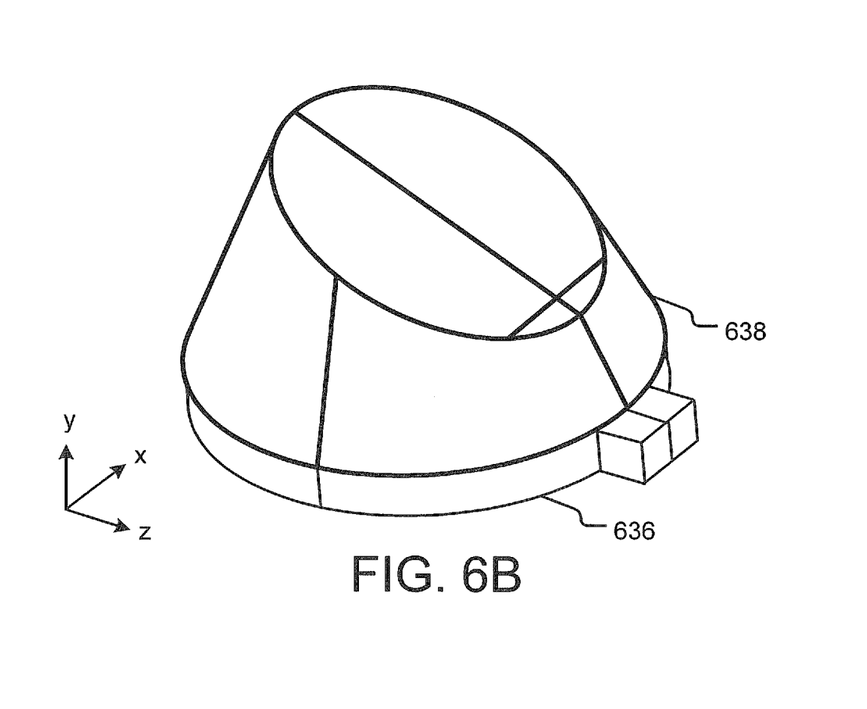
FIG. 6B illustrates the circular optical near-field transducer of FIG. 6A with an example truncated conical heat-sink.

FIG. 6B illustrates the circular optical NFT 636 of FIG. 6A with an example truncated conical heat-sink 638. The heat-sink 638 (illustrated in bold) overlays the optical NFT 636 and extends in the y-direction away from the optical NFT 636 forming a truncated cone. In one implementation, the heat-sink 636 extends a fraction of a micron in the y-direction (e.g., 50 nm-250 nm).

Figure 7:
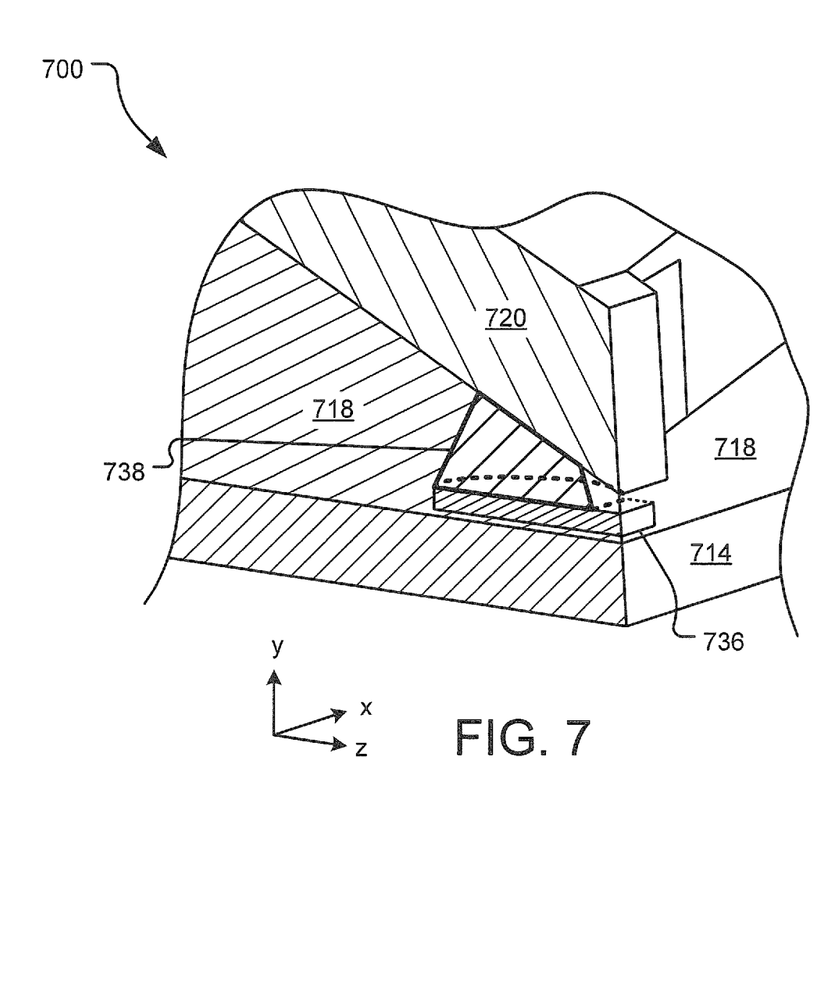
FIG. 7 illustrates a cross-section of a partial perspective view of an example heat assisted magnetic recording head having a circular optical near-field transducer with a truncated conical heat-sink.

FIG. 7 illustrates a cross-section of a partial perspective view of an example HAMR head 700 having a circular optical NFT 736 with a truncated conical heat-sink 738. Heat-sink 738 extends in the y-direction between an optical NFT 736 and a write pole 720. Thermal energy conductively transfers from the optical NFT 736 to the heat-sink 738. The thermal energy is then conducted away from the heat-sink 738 to the write pole 720 and any surrounding cladding material 718. In other implementations, the heat-sink 738 may be combined with one or more of the other heat-sinks disclosed herein.

In an implementation, one or more metals having good thermal conductivity may be used to form the heat-sink 738 (e.g., Cr, Ru, Cu, Au, Ag, Al, Ni, Ir, Pt, W, Ti, Mo, Zr, Rh, Pd, V, and alloys or dopings thereof). In some implementations, the material(s) selected to form the heat-sink 738 are also adapted to maintain coupling efficiency of the optical NFT 736. Plasmonic metals (e.g., Au, Ag, Cu, Al, Pd, V, and alloys or dopings thereof) are particularly useful to maintain coupling efficiency of the optical NFT 736. In some implementations, the heat-sink 738 may be composed of the same material as the optical NFT 736. In one implementation, the heat-sink 738 connects the optical NFT 736 and the write pole 720 in the thin film growth direction (i.e., y-direction) during wafer processing.

The optical NFT 736 is surrounded by the cladding material 718 and heat-sink 738. Waveguide core 714 bounds one side of the cladding material 718. The heat-sink 738 is bounded by the optical NFT 736, the cladding material 718, and write pole 720. In an implementation, the base of the heat-sink 738 has the same cross-sectional dimensions as the circular portion of the optical NFT 736. While a truncated conical extension of the heat-sink 738 is shown, heat-sinks may be extended in a cylindrical section or other shapes.

Often, the x-z cross-sectional area of a heat-sink of sufficient size to conduct sufficient thermal energy transfer from an optical NFT is larger than the ideal x-z cross-sectional area of the optical NFT. In implementations of FIGS. 6B and 7, the optical NFT 636, 736 is made larger than necessary to match the cross-sectional shape of the base of the truncated conical heat-sink 638, 738. While this may decrease the efficiency of the optical NFT 636, 736 by approximately 30%, power dissipated from the optical NFT 636, 736 may increase approximately 55% due to increased conductive thermal energy transfer from the optical NFT 636, 736 to the heat-sink 638, 738 and write pole 620, 720 as compared to a smaller optical NFT (see e.g., the optical NFT 516 of FIG. 5). Further, there is an inverse relationship between x-z cross-sectional area of the heat-sink 638, 738 and temperature rise of the optical NFT 636, 736 during operation of the optical NFT 636, 736, all else being equal.

Increased thermal energy transfer caused by matching the x-z cross-sectional area of the heat-sink 738 to the x-z cross-sectional area of the optical NFT 736 may result in an overall temperature reduction of approximately 50% in the optical NFT 736 as compared to an optical NFT of ideal size without heat-sink 738. The write pole 720 may absorb as much as 50% more power in this implementation as compared to an implementation without heat-sink 738. This additional power absorption reduces the operating temperature of the optical NFT, which can extend the operating life of the optical NFT.

If the heat-sink 228, 328 as depicted in FIGS. 2B and 3 is used in conjunction with heat-sink 738, the volume of heat-sink 228, 328 can dissipate much of the additional thermal energy conducted into the write pole 720. As a result, the temperature of the write pole 720 during operation of the magnetic recording head 700 may be the same or similar to the temperature of a write pole utilized with a small heat-sink or no heat-sink. The operating life of the write pole is also greatly affected by its operating temperature. Allowing the heat transferred into the write pole 720 from the heat-sink 738 to transfer out of the write pole 720 to the heat-sinks 228 or 328 helps to maintain a desired operating temperature and operating life of the write pole 720.

Figure 8:
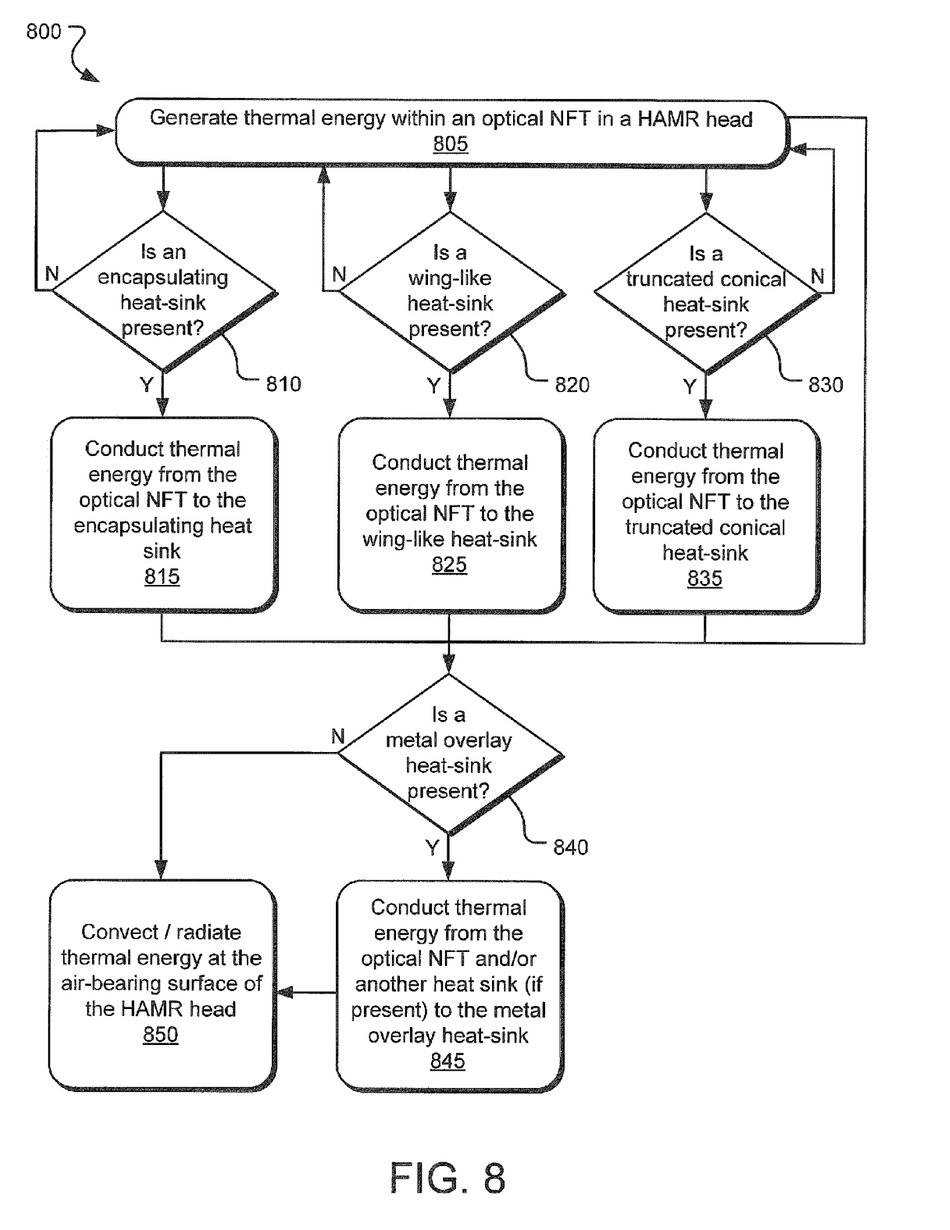
FIG. 8 illustrates example operations for conducting thermal energy away from an optical near-field transducer according to the presently disclosed technology.

FIG. 8 illustrates example operations 800 for conducting thermal energy away from an optical near-field transducer according to the presently disclosed technology. In a generation operation 805, thermal energy is generated within an optical NFT when in operation within a HAMR head. The optical NFT collects and focuses light at a magnetic media. As a result, the optical NFT heats up. One or more of the presently disclosed heat-sinks may be used to dissipate the thermal energy generated within the optical NFT.

In decision operation 810, if an encapsulating heat-sink as discussed with particularity with regard to FIG. 1 is present within the HAMR head, we proceed to conduction operation 815. If no encapsulating heat-sink is present within the HAMR head, we return to generation operation 805.

In conduction operation 815, thermal energy generated within the optical NFT is conducted to the encapsulating heat-sink. Further, thermal energy generated within the optical NFT may also be conducted to other components of the HAMR head adjacent the optical NFT (e.g., waveguide cladding and/or another heat-sink). Still further, thermal energy conducted to the encapsulating heat-sink may be further conducted to other components of the HAMR head adjacent the encapsulating heat-sink (e.g., a write pole, waveguide core, waveguide cladding and/or another heat-sink). However, conductive thermal energy transfer to the write pole, waveguide core, and/or waveguide may be limited due to insufficient thermal contact area with the optical NFT and/or encapsulating heat-sink. Also, the material construction of the write pole, waveguide core, and/or waveguide may not be particularly adapted for thermal energy transfer.

In decision operation 820, if a wing-like heat-sink as discussed with particularity with regard to FIGS. 4B and 5 is present within the HAMR head, we proceed to conduction operation 825. If no wing-like heat-sink is present within the HAMR head, we return to generation operation 805.

In conduction operation 825, thermal energy generated within the optical NFT is conducted to the wing-like heat-sink. Further, thermal energy generated within the optical NFT may also be conducted to other components of the HAMR head adjacent the optical NFT (e.g., waveguide cladding and/or another heat-sink). Still further, thermal energy conducted to the wing-like heat-sink may be further conducted to other components of the HAMR head adjacent the wing-like heat-sink (e.g., a write pole, waveguide core, waveguide cladding and/or another heat-sink).

In decision operation 830, if a truncated conical heat-sink as discussed with particularity with regard to FIGS. 6B and 7 is present within the HAMR head, we proceed to conduction operation 835. If no truncated conical heat-sink is present within the HAMR head, we return to generation operation 805.

In conduction operation 835, thermal energy generated within the optical NFT is conducted to the truncated conical heat-sink. Further, thermal energy generated within the optical NFT may also be conducted to other components of the HAMR head adjacent the optical NFT (e.g., waveguide cladding and/or another heat-sink). Still further, thermal energy conducted to the truncated conical heat-sink may be further conducted to other components of the HAMR head adjacent the truncated conical heat-sink (e.g., a write pole, waveguide core, waveguide cladding and/or another heat-sink).

In decision operation 840, if a metal overlay conical heat-sink as discussed with particularity with regard to FIGS. 2B and 3 is present within the HAMR head, we proceed to conduction operation 845. Decision operation 840 occurs when one or more of the truncated conical heat-sink, wing-like heat-sink, or encapsulating heat-sink are found present within the HAMR head.

In conduction operation 845, thermal energy generated within the optical NFT is conducted to the metal overlay heat-sink via waveguide cladding, the conical heat-sink, wing-like heat-sink, or encapsulating heat-sink, if present. Further, thermal energy generated within the optical NFT may also be conducted to other components of the HAMR head adjacent the optical NFT (e.g., waveguide cladding and/or another heat-sink). Still further, thermal energy conducted to the metal overlay heat-sink may be further conducted to other components of the HAMR head adjacent the metal overlay heat-sink (e.g., a write pole, waveguide core, waveguide cladding and/or another heat-sink).

Following conduction operation 845 if a metal overlay heat-sink is present, or following decision operation 840 if no metal overlay heat-sink is present, convection/radiation operation 850 occurs. In convection/radiation operation 850, thermal energy within one or more components of the HAMR head (e.g., one or more heat-sinks, the write pole, the optical NFT, the waveguide core, and/or the waveguide cladding) forming a convectively cooled surface (e.g., an air-bearing surface on the HAMR head) is convectively transferred to air passing between the air-bearing surface on the HAMR head and a surface of a magnetic medium. In various implementations, the HAMR head and/or magnetic medium surface move, creating air turbulence which increases convective thermal energy transfer. Further, convection/radiation operation 850 may also include radiative thermal energy transfer from the air-bearing surface on the HAMR head directly to the magnetic medium.

The greater amount of surface area of a heat-sink exposed to the air-bearing surface, the greater the convective thermal energy transfer, all else being equal. Further, the greater the amount of surface area of a heat-sink contacting the optical NFT, the greater the conductive thermal energy transfer, all else being equal. As a result, the metal overlay heat-sink may be used in conjunction with the conical heat-sink, wing-like heat-sink, or encapsulating heat-sink to improve both conduction of thermal energy away from the optical NFT and convective/radiative thermal energy transfer at the air-bearing surface. Combinations of one or more of the heat-sinks disclosed herein are referred to as heat-sink assemblies.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A heat assisted magnetic recording head comprising:
   an optical near-field transducer; and
   a heat-sink assembly in thermally conductive contact with the optical near-field transducer and having a convectively cooled surface, wherein the heat-sink assembly at least partially encapsulates the near-field transducer, wherein the heat-sink assembly includes a truncated conical extension from the optical near-field transducer.

2. The heat assisted magnetic recording head of claim 1, wherein the heat-sink assembly at least partially encapsulates the optical near-field transducer along a direction away from magnetic media.

3. The heat assisted magnetic recording head of claim 1, wherein the heat-sink assembly includes a pair of wing-like extensions from the optical near-field transducer.

4. The heat assisted magnetic recording head of claim 1, further comprising:
a write pole, wherein the heat-sink assembly includes a metallic overlay on the write pole.

5. The heat assisted magnetic recording head of claim 1, wherein the heat-sink assembly includes a first heat-sink and a second heat-sink, wherein the first heat-sink is in thermally conductive contact with the second heat-sink.

6. The heat assisted magnetic recording head of claim 1, wherein the heat-sink assembly occupies an air-bearing surface of the heat assisted magnetic recording head.

7. The heat assisted magnetic recording head of claim 1, wherein the heat-sink assembly includes an optical quality dielectric.

8. The heat assisted magnetic recording head of claim 1, wherein the heat-sink assembly includes a non-magnetic metal.

9. The heat assisted magnetic recording head of claim 1, wherein the convectively-cooled surface is an air-bearing surface facing a magnetic recording medium.

10. A system comprising:
a first heat-sink in conductive contact with an optical near-field transducer; and
a second heat-sink in conductive contact with the first heat-sink, wherein one or both of the first heat-sink and second heat-sink includes a convectively-cooled surface, wherein one or both of the first and second heat-sinks include a pair of wing-like extensions from the optical near-field transducer.

11. The system of claim 10, wherein one or both of the first and second heat-sinks at least partially encapsulates the optical near-field transducer.

12. The system of claim 10, wherein the pair of wing-like extensions extend away from the optical near-field transducer along an air-bearing surface.

13. The system of claim 10, wherein one or both of the first and second heat-sinks include a truncated conical extension from the optical near-field transducer.

14. The system of claim 10, further comprising:
a write pole, wherein one or both of the first and second heat-sinks is also in conductive contact with the write pole and includes a metallic overlay on the write pole.

15. The system of claim 10, wherein the convectively-cooled surface is an air-bearing surface facing a magnetic recording medium.

16. A method for dissipating thermal energy within an optical near-field transducer, comprising:
generating thermal energy within the optical near-field transducer;
conducting at least part of the thermal energy within the optical near-field transducer to a heat-sink assembly in conductive contact with the optical near-field transducer; and
convectively transferring at least part of the thermal energy conducted to the heat-sink assembly to an air-bearing surface at a convectively-cooled surface, wherein the heat-sink assembly includes a truncated conical extension from the optical near-field transducer.

17. The method of claim 16, wherein the heat-sink assembly includes a first heat-sink and a second heat-sink, wherein the first heat-sink is in thermally conductive contact with the second heat-sink.

18. The method of claim 16, wherein the heat-sink assembly occupies the air-bearing surface of a heat assisted magnetic recording head.

19. The method of claim 16, wherein the convectively-cooled surface faces a magnetic recording medium.

\* \* \* \* \*